United States Patent
Shea

(10) Patent No.: US 9,410,860 B2
(45) Date of Patent: Aug. 9, 2016

(54) WASHER ASSEMBLY AND JOINT MONITORING SYSTEM EMPLOYING THE SAME

(71) Applicant: EATON CORPORATION, Cleveland, OH (US)

(72) Inventor: John J. Shea, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 927 days.

(21) Appl. No.: 13/670,820

(22) Filed: Nov. 7, 2012

(65) Prior Publication Data

US 2014/0129158 A1 May 8, 2014

(51) Int. Cl.
| | |
|---|---|
| *G01R 15/00* | (2006.01) |
| *G01L 5/24* | (2006.01) |
| *G01L 1/14* | (2006.01) |
| *G01F 23/26* | (2006.01) |
| *G01M 13/00* | (2006.01) |

(52) U.S. Cl.
CPC ............... *G01L 5/243* (2013.01); *G01L 1/142* (2013.01); *G01F 23/263* (2013.01); *G01M 13/005* (2013.01)

(58) Field of Classification Search
USPC .......................................................... 702/57
See application file for complete search history.

(56) References Cited

U.S. PATENT DOCUMENTS

| | | | |
|---|---|---|---|
| 7,412,898 B1* | 8/2008 | Smith et al. ..................... | 73/761 |
| 2007/0193361 A1* | 8/2007 | Coffey et al. .................... | 73/780 |
| 2007/0205776 A1* | 9/2007 | Harish et al. .................... | 324/662 |
| 2009/0120198 A1* | 5/2009 | Dallenbach et al. ............. | 73/780 |
| 2012/0013471 A1 | 1/2012 | Jones | |
| 2013/0106197 A1* | 5/2013 | Bae et al. ........................ | 307/104 |
| 2014/0080409 A1* | 3/2014 | Frankland et al. .............. | 455/41.1 |

FOREIGN PATENT DOCUMENTS

| | | |
|---|---|---|
| DE | 19831372 A1 | 1/2000 |
| DE | 10138261 A1 | 2/2003 |
| DE | 102009043267 A1 | 4/2011 |

OTHER PUBLICATIONS

European Patent Office, "International Search Report and Written Opinion", Nov. 27, 2013, 10 pp.

* cited by examiner

*Primary Examiner* — Paul D Lee
(74) *Attorney, Agent, or Firm* — Eckert Seamans Cherin & Mellott, LLC; Grant E. Coffield; Nathaniel C. Wilks

(57) ABSTRACT

A washer assembly is for use with a fastener. The washer assembly includes a first conductive portion, a second conductive portion, and an insulating portion disposed between the first conductive portion and the second conductive portion. The first conductive portion, the second conductive portion, and the insulating portion form a variable capacitor having a capacitance based on an amount of force applied thereto by the fastener. A wireless transponder unit includes a control unit electrically connected to the variable capacitor and an antenna electrically connected to the control unit. The control unit is configured to sense the capacitance of the variable capacitor, to generate information representing the capacitance, and to output the information to a wireless reader unit via the antenna.

21 Claims, 5 Drawing Sheets

WASHER ASSEMBLY AND JOINT MONITORING SYSTEM EMPLOYING THE SAME

BACKGROUND

1. Field

The disclosed concept relates generally to joint tightness monitoring and more particularly, to electrical joint tightness monitoring.

2. Background Information

One typical type of electrical joint is formed by securing two conductors together with a fastener. The electrical performance of the electrical joint, and in particular, the conductivity of the electrical joint, depends partially on the fastener being properly tightened. A loosening of the fastener, and therefore a loosening of the electrical joint, reduces the conductivity of the electrical joint and can cause additional problems such as overheating.

Due to the aforementioned problems, it is desirable to determine whether electrical joints are properly tightened. However, verifying whether electrical joints are properly tightened can consume a technician's time. In particular, when an electrical system includes numerous electrical joints, or if it is difficult to reach electrical joints, a large amount of a technician's time can be taken verifying whether electrical joints are properly tightened. Also, the electrical joint may be energized, thus exposing the technician to a hazardous condition.

There is room for improvement in the area of monitoring the tightness of electrical joints.

SUMMARY

These needs and others are met by embodiments of the disclosed concept, which provide a Washer assembly including a variable capacitor and a wireless transponder unit.

These needs and others are also met by embodiments of the disclosed concept, which provide a joint monitoring system including a washer assembly including a variable capacitor, a wireless transponder unit, and a wireless reader unit.

In accordance with embodiments of the disclosed concept, a washer assembly for use with a fastener comprises: a first conductive portion; a second conductive portion; an insulating portion disposed between the first conductive portion and the second conductive portion, wherein the first conductive portion, the second conductive portion, and the insulating portion form a variable capacitor having a capacitance based on an amount of force applied thereto by the fastener; and a wireless transponder unit including a control unit electrically connected to said variable capacitor and an antenna electrically connected to the control unit, the control unit being configured to sense the capacitance of the variable capacitor, to generate information representing the capacitance, and to output the information to a wireless reader unit via the antenna.

In accordance with other embodiments of the disclosed concept, a washer assembly for use with a fastener comprises: a first conductive portion; a second conductive portion; an insulating portion disposed between the first conductive portion and the second conductive portion, wherein the first conductive portion, the second conductive portion, and the insulating, portion form a variable capacitor having a capacitance based on an amount of force applied thereto by the fastener; and a wireless transponder unit including a control unit electrically connected to the variable capacitor and an antenna electrically connected to the variable capacitor, the control unit being configured to output information to a wireless reader unit via the antenna, wherein a change in the capacitance of the variable capacitor causes a change in a resonant frequency of the wireless transponder unit.

In accordance with other embodiments of the disclosed concept, a joint monitoring, system for monitoring a joint comprises: a first member; a second member; a fastener structured to fasten the first member and the second member together to form the joint; a washer assembly disposed between a portion of the fastener and one of the first member and the second member, the washer assembly comprising: a first conductive portion, a second conductive portion, and an insulating portion disposed between the first conductive portion and the second conductive portion, wherein the first conductive portion, the second conductive portion, and the insulating portion form a variable capacitor having a capacitance based on an amount of force applied thereto by the fastener; a wireless transponder unit including a control unit electrically connected to the variable capacitor and an antenna electrically connected to the control unit, the control unit being configured to sense the capacitance of the variable capacitor, to generate information representing the capacitance, and to output the information via the antenna; and a wireless reader unit configured to receive the outputted information.

BRIEF DESCRIPTION OF THE DRAWINGS

A full understanding of the disclosed concept can be gained from the following description of the preferred embodiments when read in conjunction with the accompanying drawings in which:

FIGS. 6 and 9 are block diagrams of joint monitoring systems in accordance with other embodiments of the disclosed concept

Figure 1:
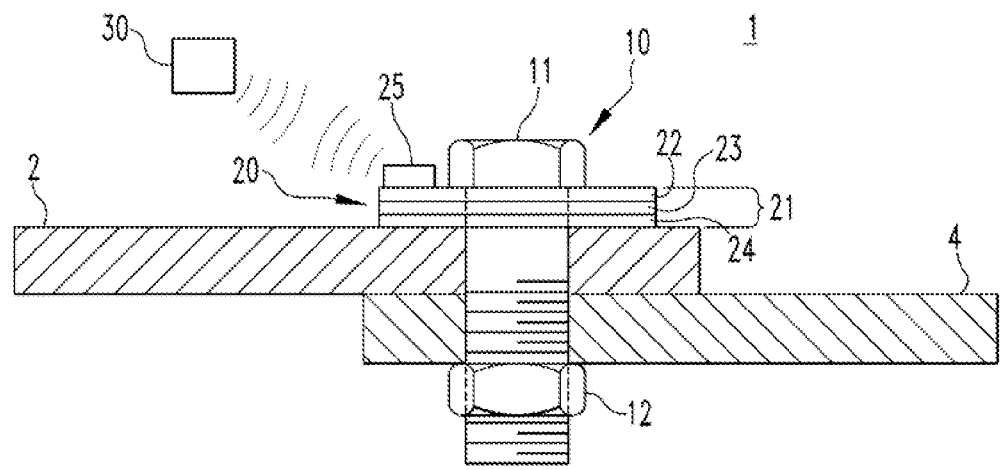
FIGS. 1 and 2 are elevation views of joint monitoring systems in accordance with some embodiments of the disclosed concept.

DESCRIPTION OF THE PREFERRED EMBODIMENTS.

Directional phrases used herein, such as, for example, left right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality), As employed herein, the term "washer" refers to any member structured to be placed between a portion of fastener and an item that is being fastened.

As employed herein, the term "Bellville type washer" refers to any washer that has an arc shaped cross section.

Referring to FIG. 1, a joint includes first and second members 2,4 fastened together with a fastener 10. Tightness of the joint is monitored with a joint monitoring system. The joint monitoring system includes a washer assembly 20 disposed between a portion of the fastener 10 and one of the first and second members 2,4 and a wireless reader unit 30. The washer assembly 20 includes a variable capacitor 21 formed by a first conductive portion 22, a suitable dielectric insulating portion 23, and a second conductive portion 24. The washer assembly 20 further includes a wireless transponder unit 25 disposed on one of the first and second conductive members 22,24. The wireless transponder unit 25 and the wireless reader unit 30 are configured to wirelessly communicate.

The joint may be an electrical joint. In the case that the joint is an electrical joint, the first and second members 2,4 conduct electricity therethrough. The first and second members 2,4 may be formed in whole, or in part, of a conductive material.

The example fastener 10 includes a bolt 11 and a nut 12. However, it is contemplated that any suitable fastener may be used to fasten the first and second members 2,4 together.

The first conductive portion 22 is employed as the first conductive plate of the variable capacitor 21 and the second conductive portion 24 is employed as the second conductive plate of the variable capacitor 21. The insulating portion 23 is disposed between the first and second conductive portions 22,24. The insulating portion 23 creates at least a part of a gap between the first and second conductive portions 22,24. The gap between the first and second conductive portions 22,24 may also include an air gap or a gap created by other materials.

The capacitance of the variable capacitor 21 changes based on the force applied to it. For example, tightening of the fastener 10 applies force to the variable capacitor 21, thus changing the capacitance of the variable capacitor 21. The force applied, to the variable capacitor 21 causes the first and second conductive portions 22,24 to move towards each other, thus reducing the size of the gap between them. The change in the size of the gap between the first and second conductive portions 22,24 causes the change in capacitance of the variable capacitor 21.

The washer assembly 20 also includes a Wireless transponder unit 25. The wireless transponder unit 25 is electrically connected to the variable capacitor 21. The wireless transponder unit 25 provides an output based on the capacitance of the variable capacitor 21.

The joint monitoring, system further includes a wireless reader unit 30. The wireless reader unit 30 corresponds to the wireless transponder unit 25 and is configured to receive the output of the wireless transponder unit 25. In one non-limiting example embodiment, the wireless transponder unit 25 is a passive transponder that responds to interrogation by the wireless reader unit 30. In another non-limiting example embodiment, the wireless transponder unit 25 includes a power source or receives power from a power source other than the wireless reader unit 30, and can provide an output without being interrogated by the wireless reader unit 30. The wireless transponder unit 25 may be, for example and without limitation, a radio frequency identification (RFID) tag and the wireless reader unit 30 may be, for example and without limitation, an RFID reader.

Figure 2:
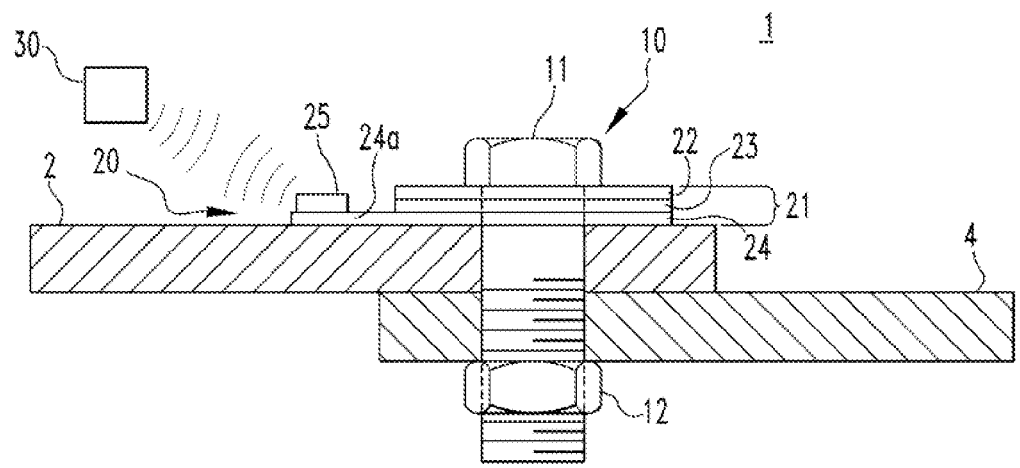

Referring to FIG. 1, the first conductive portion 22, the insulating portion 23, and the second conductive portion 24 have similar dimensions. However, it is contemplated that at least one of the first conductive portion 22, the insulating portion 23, and the second conductive portion 24 can extend further than the other of the first conductive portion 22, the insulating portion 23, and the second conductive portion 24 in at least one direction. For example, referring to FIG. 2, the example second conductive member 24 includes an extended portion 24a that extends beyond the edges of the first conductive portion 22 and the insulating portion 23. The wireless transponder unit 25 is disposed on the extended portion 24a of the second conductive member 24.

In another example embodiment, the insulating portion 23 is formed as a coating on one of the first and second conductive portions 22,24.

Figure 3A:
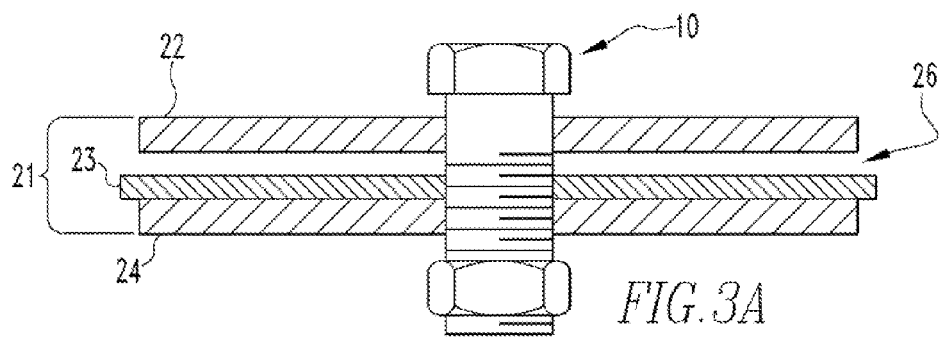
FIGS. 3A, 3B, 4A, 4B, 5A, 5B, 6A, 6B, 6C, and 7 are elevation views of variable capacitors in accordance with other embodiments of the disclosed concept.
Figure 3B:
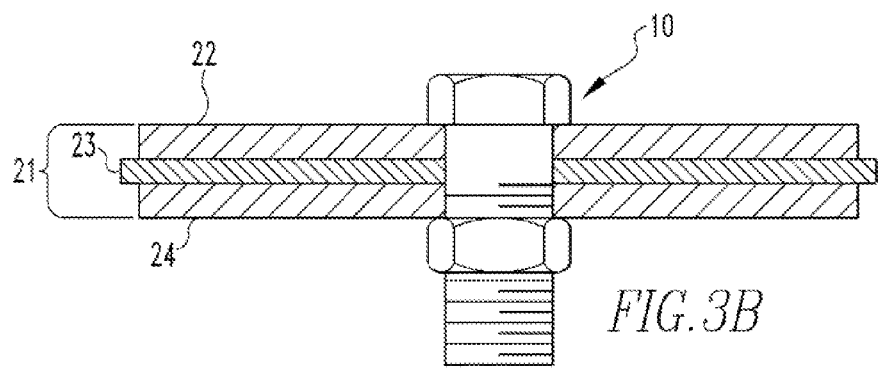

Referring to FIGS. 3A-3B, one non-limiting embodiment of the variable capacitor 21 is shown. The first conductive portion 22, the insulating portion 23, and the second conductive portion 24 are flat washers. In FIG. 3A, the fastener 10 is not applying force to the variable capacitor 21. Surfaces of the first conductive portion 22, the insulating portion 23, and the second conductive portion 24 are inherently uneven due to imperfections in their constructions, and thus, a number of relatively small air gaps 26 are formed between the first and second conductive portions 22,24 and the insulating portion 23.

Referring to FIG. 3B, force is applied to the variable capacitor 21 by the fastener 10. The force causes the first and second conductive portions 22,24 to compress against the insulating portion 23. The compression causes the size of any air gaps (riot shown) between the first and second conductive portions 22,24 and the insulating portion 23 to be reduced, thus reducing the size of the gap between the first and second conductive portions 22,24. Furthermore, in another example embodiment, the insulating portion 23 is constructed of a compressible material which compresses from the force applied by the fastener 10, thus further reducing the gap between the first and second conductive portions 22,24.

Figure 4A:
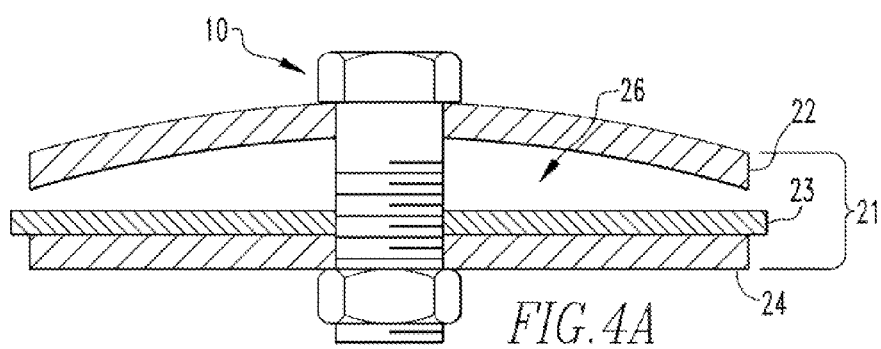
Figure 4B:
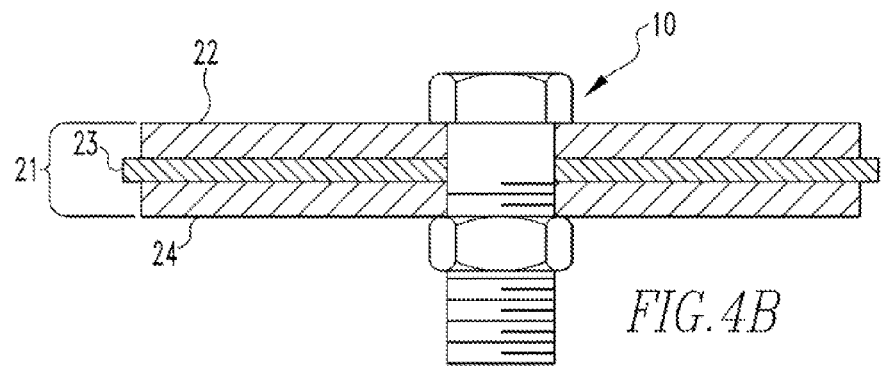

Referring to FIGS. 4A-4B, another example embodiment of the variable capacitor 21 is shown. The first conductive portion 22 is a Bellville type washer, and the insulating portion 23 and second conductive portion 24 are flat washers. In FIG. 4A, the fastener 10 is not applying force to the variable capacitor 21. The curved surface of the first conductive portion 22 creates an air gap 26 between the first conductive portion 22 and the insulating portion 23.

Referring to FIG. 4B, force is applied, to the variable capacitor 21 by the fastener 10. The force causes the first conductive portion 22 to compress and flatten against the insulating portion 23. The compression causes the size of the air gap 26 between the first conductive portions 22 and the insulating portion 23 to be reduced, thus reducing, the size of the gap between the first and second conductive portions 22,24.

Figure 5A:
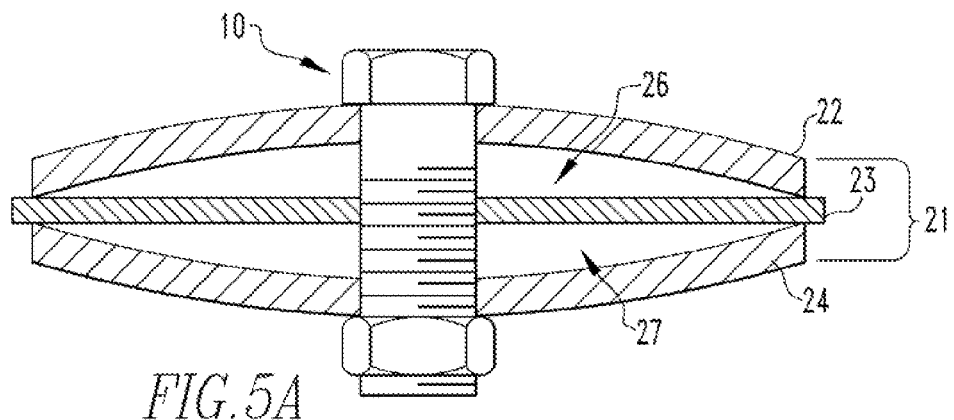
Figure 5B:
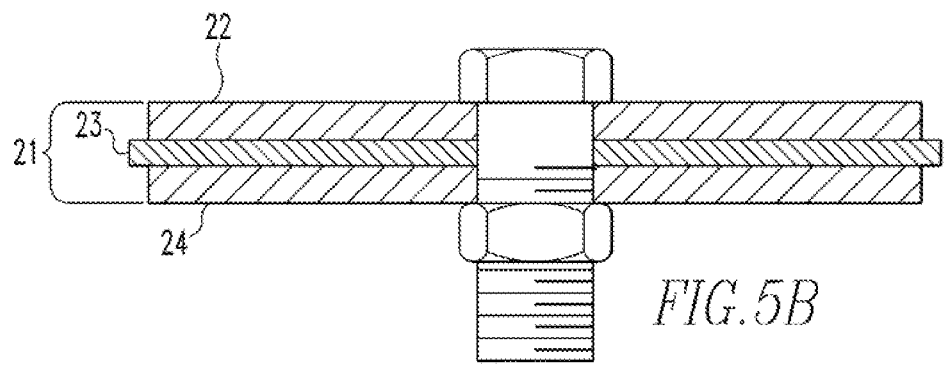

Referring to FIGS. 5A-5B, another example embodiment of the variable capacitor 21 is shown. The first conductive portion 22 and second conductive portion 24 are Bellville type washers, and the insulating portion 23 is a flat washer. The first and second conductive portions 22,24 are arranged such that their concave sides face each other. In FIG. 5A, the fastener 10 is not applying force to the variable capacitor 21. The curved surface of the first conductive portion 22 creates a first air gap 26 between the first conductive portion 22 and the insulating portion 23 and the curved surface of the second conductive portion 24 creates a second air gap 27 between the second conductive portion 24 and the insulating portion 23.

Referring to FIG. 5B, farce is applied to the variable capacitor 21 by the fastener 10. The force causes the first and second conductive portions 22,24 to compress and flatten against the insulating member 23. The compression causes the size of the first and second air gaps 26,27 to be reduced, thus reducing the size of the gap between the first and second conductive portions 22,24.

Figure 6A:
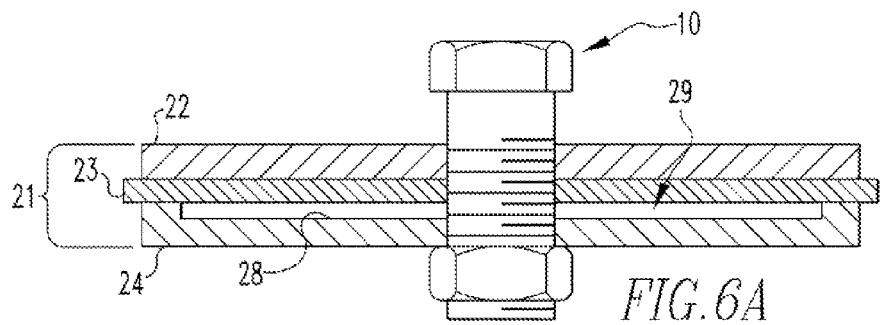
Figure 6B:
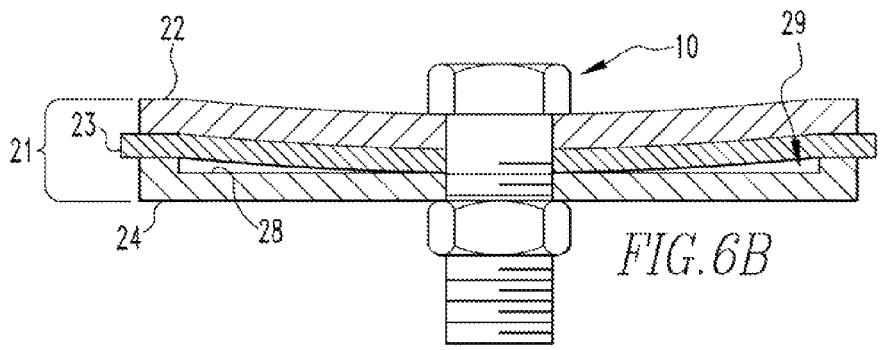
Figure 6C:
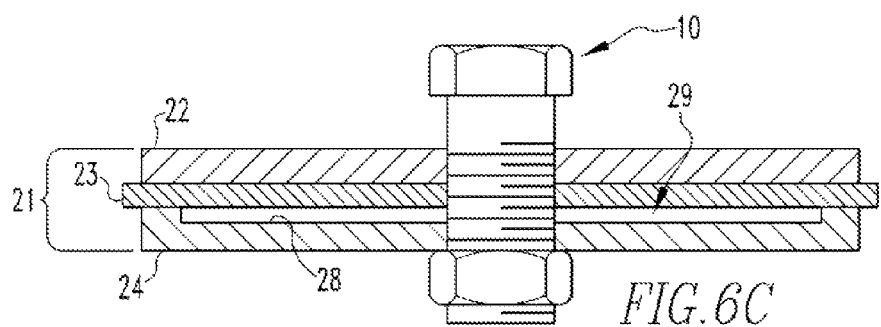

Referring, now to FIGS. 6A-6C, another example embodiment of the variable capacitor 21 is shown. In FIG. 6A, the fastener 10 is not applying force to the variable capacitor 21. The first conductive portion 22 and the insulating portion 23 are flat washers. The second conductive portion 24 is a washer having a depressed central portion 28. The depressed central portion 28 causes an air gap 26 to be formed between the second conductive portion 24 and the insulating portion 23.

When force is applied to the variable capacitor 21 by the fastener 10, as shown in FIG. 6B, central portions of the first conductive portion 22 and insulating portion 23 are pressed into the depressed central portion 28 of the second conductive portion 24, thus reducing the size of the air gap 29 and reducing the size of the gap between the first and second conductive portions 22,24. Furthermore, the first conductive portion 22 and insulating portion 23 are constructed of resilient material which returns to its original shape when the force is released, as shown in FIG. 6C.

Figure 7:
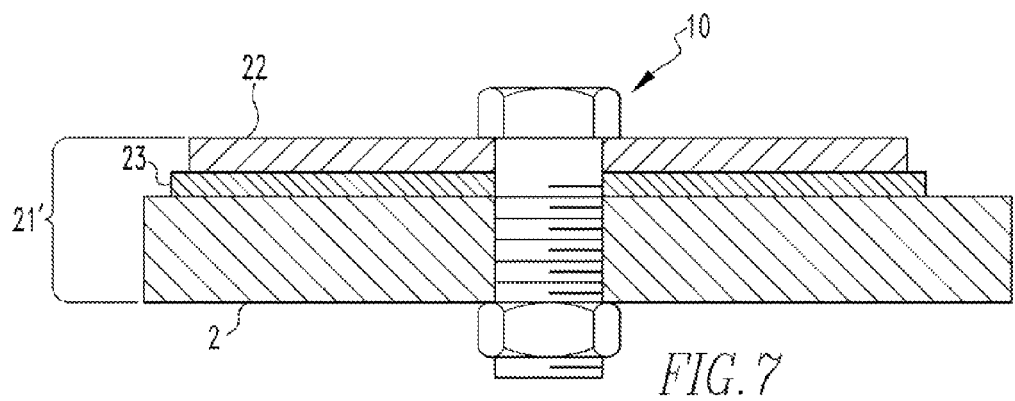

Referring to FIG. 7, another example embodiment of a variable capacitor 21' is shown. The variable capacitor 21' is similar to the variable capacitor 21 shown in FIG. 4A. However, in the variable capacitor 21 shown in FIG. 7, the second conductive portion 24 is omitted. Instead, the first member 2 of the joint is employed as the second plate of the variable capacitor 21'. Similar to the variable capacitor 21 shown in FIG. 4, a number of relatively small air gaps are formed between the first conductive portion 22 and insulating portion 23 of the variable capacitor 21' shown in FIG. 7. Additionally, a number of small air gaps are formed between the first member 2 and the insulating portion 23. Applying force to the variable capacitor 21' through the fastener 10 causes the size of the air gaps to be reduced, thus reducing the size of the gap between the first conductive portion 22 and first member 2 of the joint.

Figure 8:
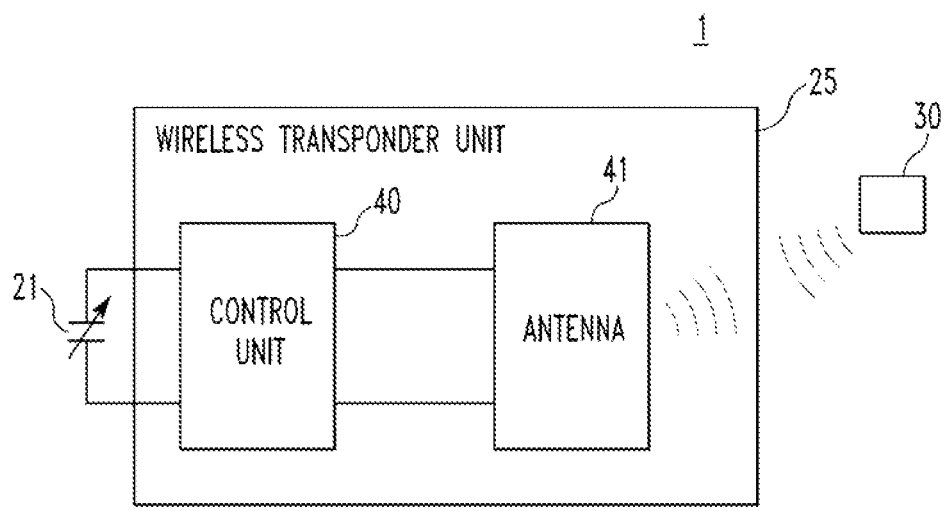

In FIG. 8, a block diagram of the joint monitoring system according to a non-limiting example embodiment of the disclosed concept is shown. In the example embodiment of FIG. 8, the wireless transponder unit 25 includes a control unit 40 and an antenna 41, and the variable capacitor 21 is electrically connected to the control unit 40. The control unit 40 senses the capacitance of the variable capacitor 21 and generates information representing the capacitance. The control unit 40 then outputs the generated information to the wireless reader unit 30, for example, when the wireless transponder unit 25 is interrogated by the wireless reader unit 30. Since the capacitance of the variable capacitor 21 is based on the force applied to it, the wireless reader unit 30 can use the information representing the capacitance to determine whether the proper amount of force is applied, to the variable capacitor 21. Thus, the wireless reader unit 30 can determine whether the corresponding joint is properly tightened. For example and without limitation, the wireless reader unit 30 can determine whether the capacitance of the variable capacitor 21 is within a predetermined range corresponding to a properly tightened joint based on the information received from the wireless transponder unit 25, and determine that the joint is not properly tightened when the capacitance of the variable capacitor 21 is outside the predetermined range.

Figure 9:
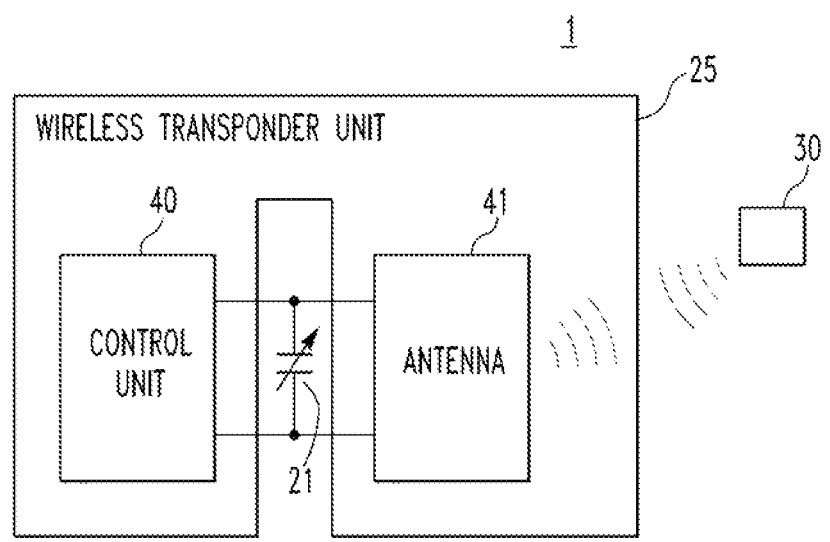

FIG. 9 is a block diagram of the joint monitoring system according to another non-limiting example embodiment of the disclosed concept. In the example embodiment of FIG. 9, the wireless transponder unit 25 includes a control unit 40 and an antenna 41, and the variable capacitor 21 is electrically connected to the antenna 41. The wireless transponder unit 25 has a resonant frequency that is determined by the antenna 41 and components connected to it. As such, the variable capacitor 21 affects the resonant frequency of the wireless transponder unit 25, and any changes in the capacitance of the variable capacitor 21 change the resonant frequency of the wireless transponder unit 25.

In the example embodiment of FIG. 9, the wireless reader unit 30 is configured to be able to communicate with the wireless transponder unit 25 when the resonant frequency of wireless transponder unit 25 is at the operating frequency, or within a predetermined operating frequency range, of the wireless reader unit 30. When the resonant frequency of the wireless transponder unit 25 is outside predetermined operating frequency range of the wireless reader unit 30, the wireless reader unit 30 and the wireless transponder unit 25 cannot communicate.

The variable capacitor 21 and the wireless transponder unit 25 are configured such that when the force applied to the variable capacitor 21 is within a predetermined range (e.g., without limitation, a range of forces corresponding to a joint that is considered to be properly tightened), the resonant frequency of the wireless transponder unit 25 is within the normal operating frequency range of the wireless reader unit 30, thus permitting communication between the wireless transponder unit 25 and the wireless reader unit 30. When the force applied to the variable capacitor 21 is outside the predetermined range, the resonant frequency of the wireless transponder unit 25 is outside the normal operating frequency range of the wireless reader unit 30, thus preventing communication between the wireless transponder unit 25 and the wireless reader unit 30. A failure of communication between the wireless transponder unit 25 and the wireless reader unit 30 (e.g., without limitation, a failure of the wireless transponder unit 25 to respond to an interrogation signal from the wireless reader unit 30) can advantageously be used as an indication that the joint is not properly tightened.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A washer assembly for use with a fastener, the washer assembly comprising:
    a first conductive portion;
    a second conductive portion;
    an insulating portion disposed between the first conductive portion and the second conductive portion, wherein the first conductive portion, the second conductive portion, and the insulating portion form a variable capacitor having a capacitance based on an amount of force applied thereto by the fastener; and
    a wireless transponder unit including a control unit electrically connected to said variable capacitor and an antenna electrically connected to said control unit, the control unit being configured to sense the capacitance of the variable capacitor, to generate information representing said capacitance, and to output said information to a wireless reader unit via said antenna,
    wherein one of the first conductive portion, the insulating portion, and the second conductive portion includes an extended portion that extends beyond the edges of the other of the first conductive portion, the insulating portion, and the second conductive portion; and wherein said wireless transponder unit is disposed on said extended portion.

2. The washer assembly of claim 1, wherein the first and second conductive portions are flat washers.

3. The washer assembly of claim 1, wherein the first and second conductive portions are flat washers.

4. The washer assembly of claim 1, wherein one of the first and second conductive portions is a Bellville type washer and the other of the first and second conductive portions is a flat washer.

5. The washer assembly of claim 1, wherein the first and second conductive portions are Bellville type washers.

6. The washer assembly of claim 1, wherein one of the first and second conductive portions is a flat washer and the other of the first and second conductive portions is a washer having a depressed central portion.

7. The washer assembly of claim 1, wherein one of the first and second conductive portions is a washer and the other of the first and second conductive portions is a bus bar.

8. The washer assembly of claim 1, wherein said wireless transponder unit is a radio frequency identification unit.

9. A washer assembly for use with a fastener, the washer assembly comprising:
   a first conductive portion;
   a second conductive portion;
   an insulating portion disposed between the first conductive portion and the second conductive portion, wherein the first conductive portion, the second conductive portion, and the insulating portion form a variable capacitor having a capacitance based on an amount of force applied thereto by the fastener; and
   a wireless transponder unit including a control unit electrically connected to said variable capacitor and an antenna electrically connected to said variable capacitor, the control unit being configured to output information to a wireless reader unit via said antenna,
   wherein a change in the capacitance of the variable capacitor causes a change in a resonant frequency of the wireless transponder unit, and
   wherein when the force applied to the variable capacitor is within a predetermined range, the resonant frequency of the wireless transponder unit is within an operating frequency range of the wireless reader unit, and when the force applied to the variable capacitor is outside the predetermined range, the resonant frequency of the wireless transponder unit is outside the operating frequency range of the wireless reader unit.

10. The washer assembly of claim 9, wherein the first and second conductive portions are washers.

11. The washer assembly of claim 10, wherein the wireless transponder unit is disposed on one of the first and second conductive portions.

12. The washer assembly of claim 9, wherein the first and second conductive portions are flat washers.

13. The washer assembly of claim 9, wherein one of the first and second conductive portions is a Bellville type washer and the other of the first and second conductive portions is a flat washer.

14. The washer assembly of claim 9, wherein the first and second conductive portions are Bellville type washers.

15. The washer assembly of claim 9, wherein one of the first and second conductive portions is a flat washer and the other of the first and second conductive portions is a washer having a depressed central portion.

16. The washer assembly of claim 9, wherein one of the first and second conductive portions is a washer and the other of the first and second conductive portions is a bus bar.

17. The washer assembly of claim 9, wherein said wireless transponder unit is a radio frequency identification circuit.

18. A washer assembly for use with a fastener, the washer assembly comprising:
   a first conductive portion;
   a second conductive portion;
   an insulating portion disposed between the first conductive portion and the second conductive portion, wherein the first conductive portion, the second conductive portion, and the insulating portion form a variable capacitor having a capacitance based on an amount of force applied thereto by the fastener, and
   a wireless transponder unit including a control unit electrically connected to said variable capacitor and an antenna electrically connected to said variable capacitor, the control unit being configured to output information to a wireless reader unit via said antenna,
   wherein a change in the capacitance of the variable capacitor causes a change in a resonant frequency of the wireless transponder unit, and
   wherein one of the first conductive portion, the insulating portion, and the second conductive portion includes an extended portion that extends beyond the edges of the other of the first conductive portion, the insulating portion, and the second conductive portion; and wherein said wireless transponder unit is disposed on said extended portion.

19. A joint monitoring system for monitoring a joint, the joint monitoring system comprising:
   a first member;
   a second member;
   a fastener structured to fasten the first member and the second member together to form the joint;
   a washer assembly disposed between a portion of the fastener and one of the first member and the second member, the washer assembly comprising:
      a first conductive portion,
      a second conductive portion, and
      an insulating portion disposed between the first conductive portion and the second conductive portion, wherein the first conductive portion, the second conductive portion, and the insulating portion form a variable capacitor having a capacitance based on an amount of force applied thereto by the fastener;
   a wireless transponder unit including a control unit electrically connected to said variable capacitor and an antenna electrically connected to said control unit, the control unit being configured to sense the capacitance of the variable capacitor, to generate information representing said capacitance, and to output said information via said antenna; and
   a wireless reader unit configured to receive said outputted information,
   wherein one of the first conductive portion, the insulating portion, and the second conductive portion includes an extended portion that extends beyond the edges of the other of the first conductive portion, the insulating portion, and the second conductive portion; and wherein said wireless transponder unit is disposed on said extended portion.

20. The joint monitoring system of claim 19, wherein said wireless reader unit is configured to transmit an interrogation signal to said wireless transponder unit; and wherein said wireless reader unit determines that said joint is not properly tightened when said wireless transponder unit fails to respond to said interrogation signal.

21. The joint monitoring system of claim 19, wherein said wireless reader unit is configured to transmit an interrogation signal to said wireless transponder unit and said wireless transponder unit is configured to output said information in response to said interrogation signal; and wherein said wireless reader unit determines whether the sensed capacitance is within a predetermined range based on said outputted information and determines that said joint is not properly tightened when the sensed capacitance is outside the predetermined range.

\* \* \* \* \*